(12) United States Patent
Sannino et al.

(10) Patent No.: US 12,534,312 B2
(45) Date of Patent: Jan. 27, 2026

(54) SORTING PLANT

(71) Applicant: SYSTEM LOGISTICS S.P.A., Fiorano Modenese (IT)

(72) Inventors: Stefano Sannino, Fiorano Modenese (IT); Erion Dalipaj, Rubiera (IT)

(73) Assignee: SYSTEM LOGISTICS S.P.A., Fiorano Modenese (IT)

( * ) Notice: Subject to any disclaimer, the term of this patent is extended or adjusted under 35 U.S.C. 154(b) by 848 days.

(21) Appl. No.: 17/728,289

(22) Filed: Apr. 25, 2022

(65) Prior Publication Data

US 2022/0348425 A1 Nov. 3, 2022

(30) Foreign Application Priority Data

Apr. 30, 2021 (IT) .......................... 102021000011081

(51) Int. Cl.
*B65G 61/00* (2006.01)
*B65G 1/137* (2006.01)
(Continued)

(52) U.S. Cl.
CPC ........... *B65G 61/00* (2013.01); *B65G 1/1378* (2013.01); *B65G 47/902* (2013.01); *B65G 57/24* (2013.01); *B65G 2203/0266* (2013.01)

(58) Field of Classification Search
CPC .................... B65G 61/00; B65G 57/24; B65G 2203/0266; B65G 1/1378; B65G 47/902
See application file for complete search history.

(56) References Cited

U.S. PATENT DOCUMENTS

| 6,315,513 B1 * | 11/2001 | Harukawa | ............. B65G 61/00 |
| | | | 414/626 |
| 6,705,523 B1 * | 3/2004 | Stamm | .................. G06Q 10/08 |
| | | | 235/383 |

(Continued)

FOREIGN PATENT DOCUMENTS

| DE | 102012016522 A1 | 3/2013 |
| JP | 2019532371 A * | 11/2019 ........... G06Q 10/043 |

(Continued)

*Primary Examiner* — Ernesto A Suarez
*Assistant Examiner* — Laurence R Brothers
(74) *Attorney, Agent, or Firm* — Chrisman Gallo Tochtrop LLC

(57) ABSTRACT

A plant for forming pallets, comprising:
an entry station (2);
a plurality of picking areas (4),
one or more autonomous entry vehicles (3), each of which is arranged to withdraw at least one entry pallet (Pi) from the entry station (2) and to lead the withdrawn pallet (Pi) to a given picking area (4);
a plurality of release areas (5),
at least one manipulator (6), structured to withdraw a package (C) from an entry pallet (Pi) and to position the package (C) on an exit pallet (Pu) positioned in a release area (5);
an exit station (7);
one or more autonomous exit vehicles (8), each of which is arranged to withdraw at least one exit pallet (Pu) from the release area (5) and to lead the withdrawn pallet (Pu) to the exit station (7) or to a subsequent release area (5).

Figure 1:
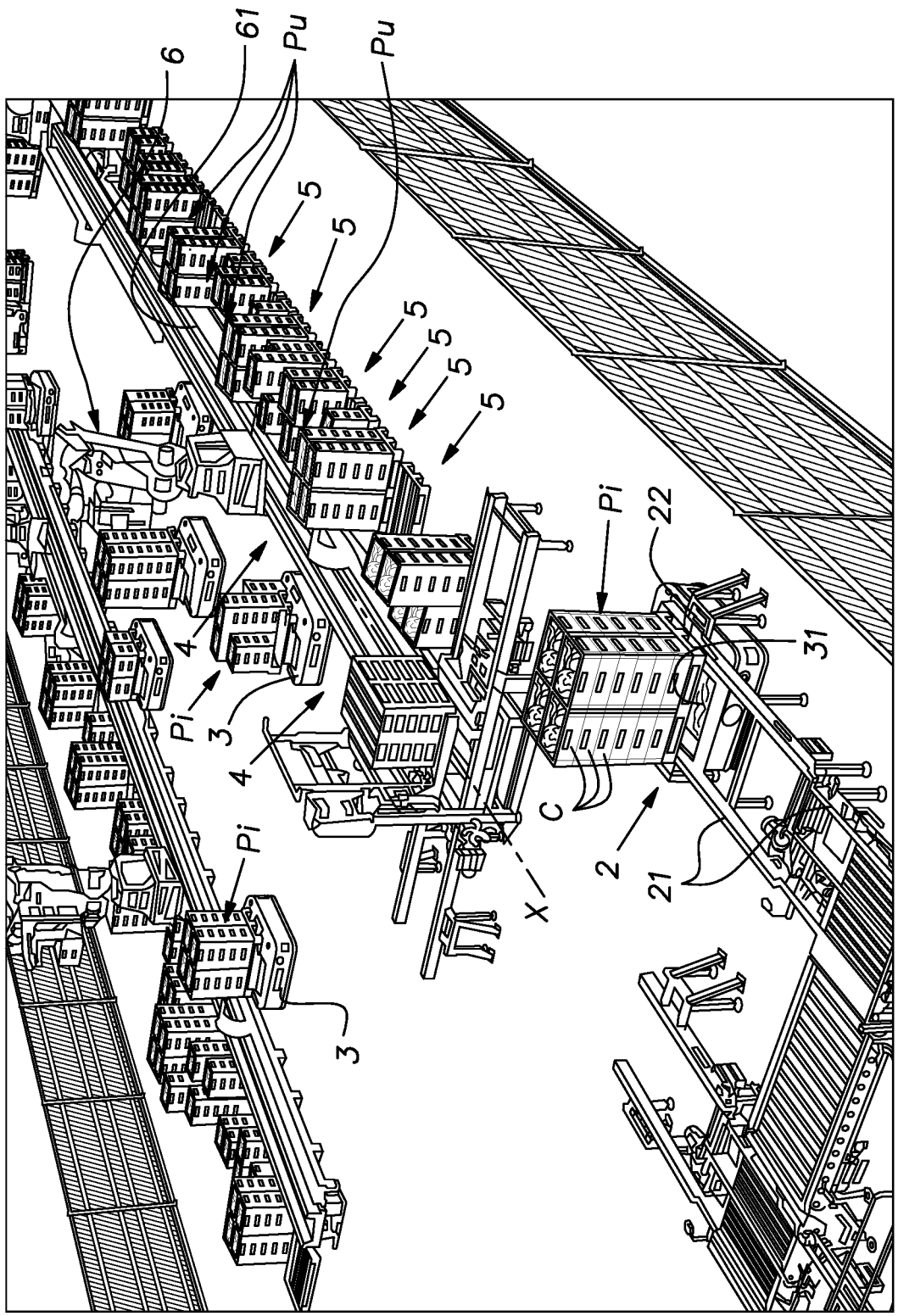

The manipulator (6) is movable along a path (61) parallel to a main direction (X) between at least two extreme positions. The picking areas (4) are distributed on one side of the path (61), in a position reachable by the manipulator (6). The release areas are distributed on the opposite side of the path (Continued)

(61) with respect to the picking areas (4), in a position reachable by the manipulator (6).

9 Claims, 7 Drawing Sheets

(51) Int. Cl.
*B65G 47/90* (2006.01)
*B65G 57/24* (2006.01)

(56) References Cited

U.S. PATENT DOCUMENTS

| | | | |
|---|---|---|---|
| 2008/0267759 A1* | 10/2008 | Morency | B65G 60/00 414/788.1 |
| 2009/0028686 A1* | 1/2009 | Tallis | B65G 61/00 414/793.4 |
| 2020/0103882 A1* | 4/2020 | Sullivan | G05B 19/41895 |

FOREIGN PATENT DOCUMENTS

| | | |
|---|---|---|
| WO | 2018229591 A1 | 12/2018 |
| WO | 2020255006 A2 | 12/2020 |

\* cited by examiner

SORTING PLANT

The present invention relates to a sorting plant. In particular, the plant according to the present invention is structured to sort objects such as boxes, crates or the like, allowing the transfer thereof from one or more entry pallets to one or more exit pallets.

The sorting plant according to the present invention is particularly useful in the management of logistics centres intended to compose exit pallets formed by different packages which are brought to the plant on respective entry pallets.

Sorting plants are known, for example for the distribution of fruit and vegetables, which manage the products in the following manners. The plants receive various entry pallets, each of which is formed by a certain number of crates or boxes of products, which can be the same or different from each other.

The entry pallets are gradually led by the operators, typically by means of forklifts, to a picking area, at which a robotic arm withdraws one or more boxes from the entry pallets and positions them on one or more exit pallets. The exit pallets are selected by the arm based on a predetermined logic, which is based on orders referring to exit pallets formed by boxes coming from different entry pallets.

In the known type plants, although the robot can reach various positions within a predetermined work area, it is fixed, i.e., it is not able to move to expand its range of action. This means that as the number and type of products managed increases, as well as to increase plant productivity, it is necessary to increase the number of robots. As the number of robots increases, so does the space required for robot manoeuvring, space which cannot be used for the storage of products, resulting in a reduction in plant capacity per surface unit.

A further limitation of the known type of plants is the lack of flexibility in the management of different products. To change the composition of the exit pallets, it is necessary to resort to further internal movements of the products, in order to lead them to the robot intended to form a certain exit pallet.

The aim of the present invention is to overcome the drawbacks of the currently available sorting plants.

An advantage of the plant according to the present invention is that, with the same manipulators used, it allows to significantly increase the number and composition possibilities of the exit pallets.

Another advantage of the plant according to the present invention is that it allows to significantly reduce the space occupied, with an equal production capacity of a current plant.

A further advantage of the plant according to the present invention is to significantly reduce the number of operators assigned to management and control.

Figure 2:
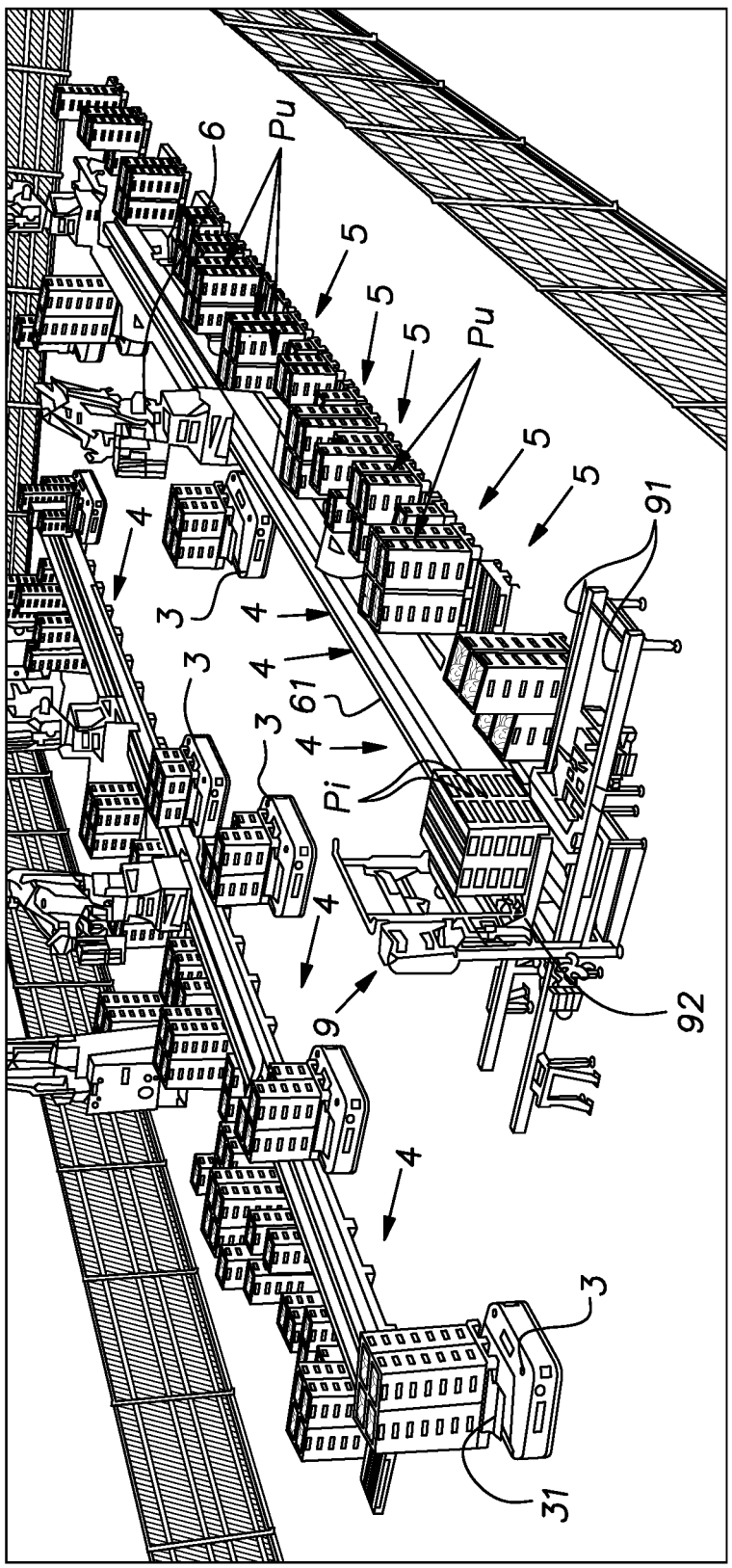
Figure 3:
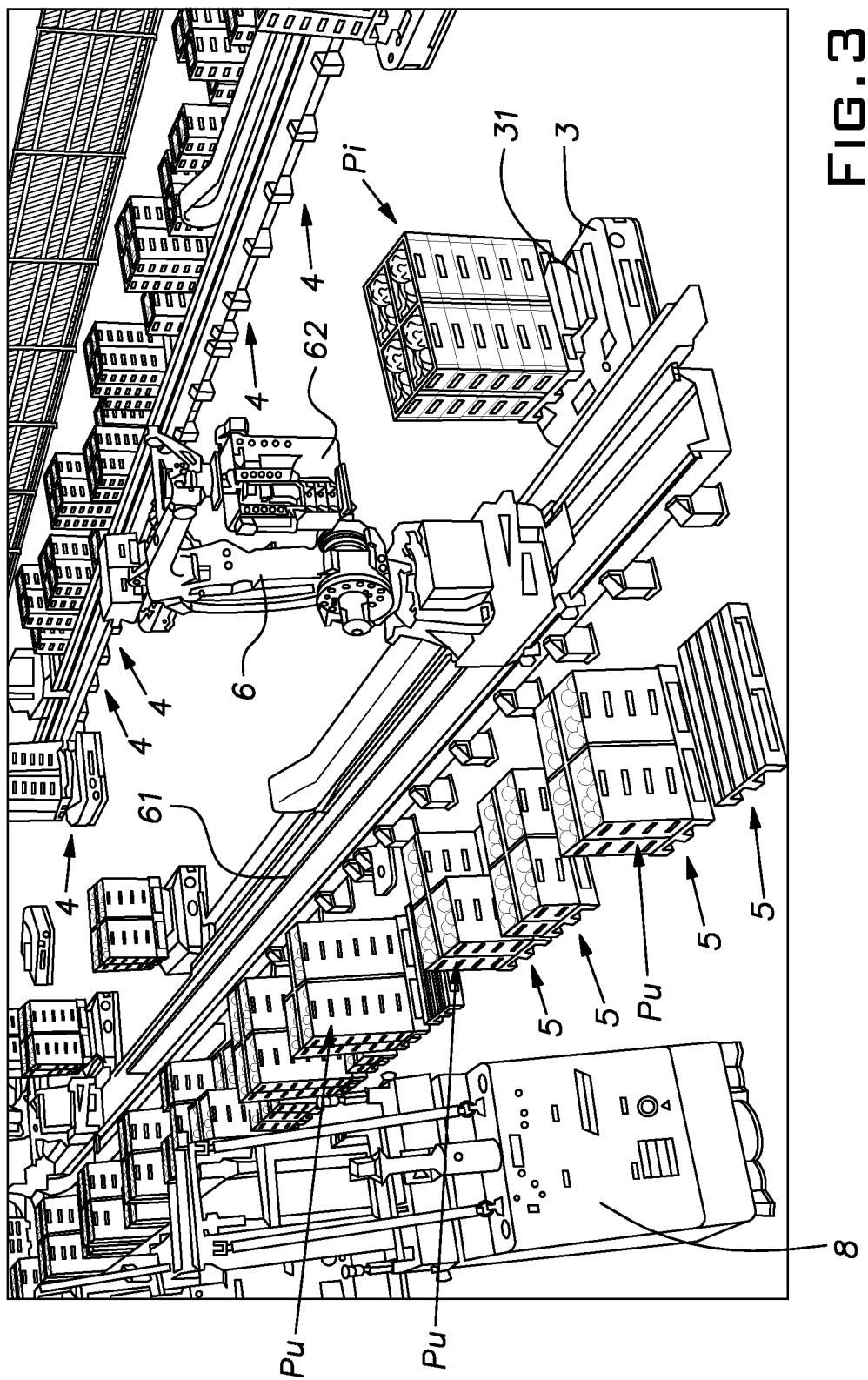
Figure 4:
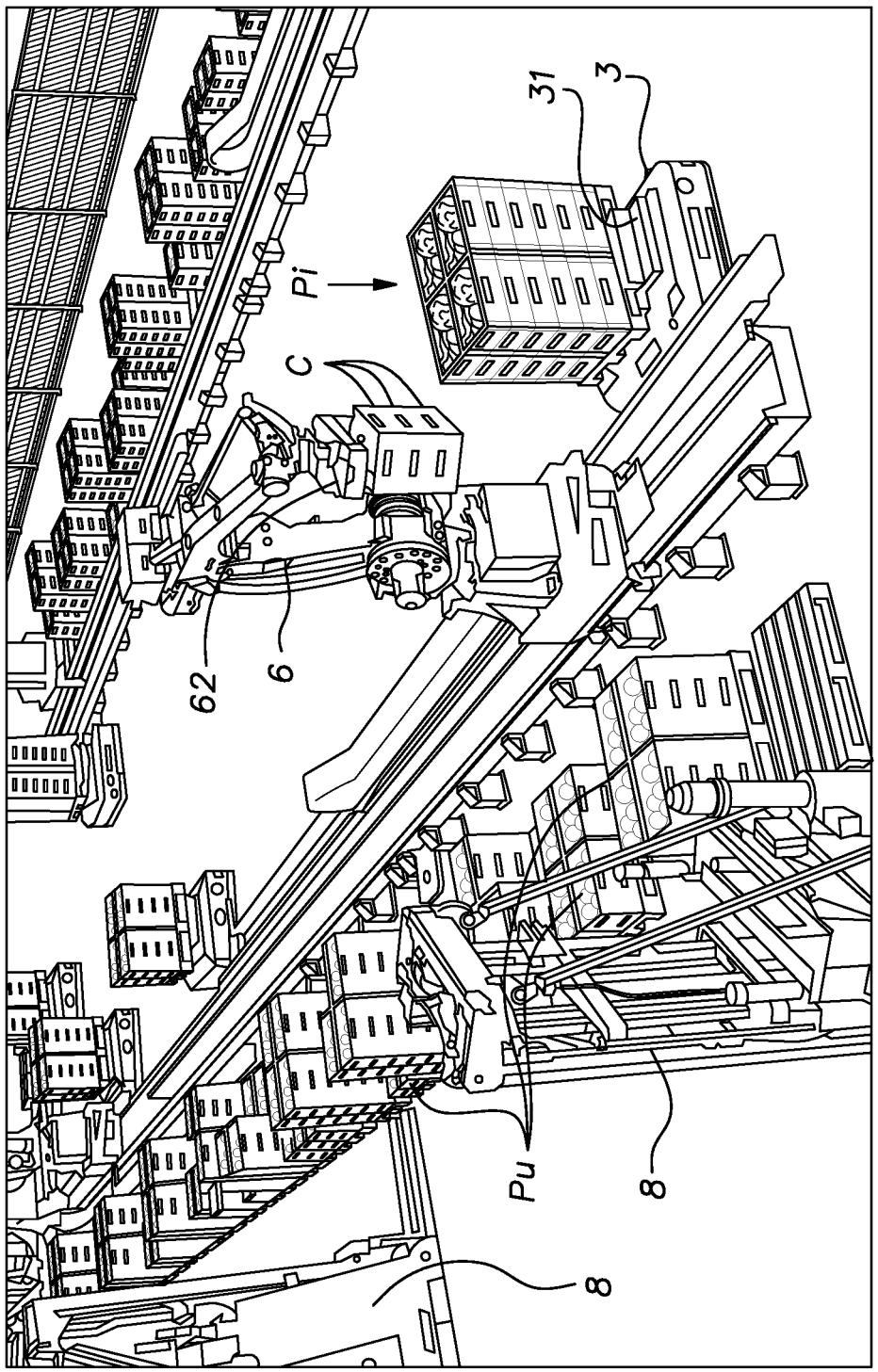
Figure 5:
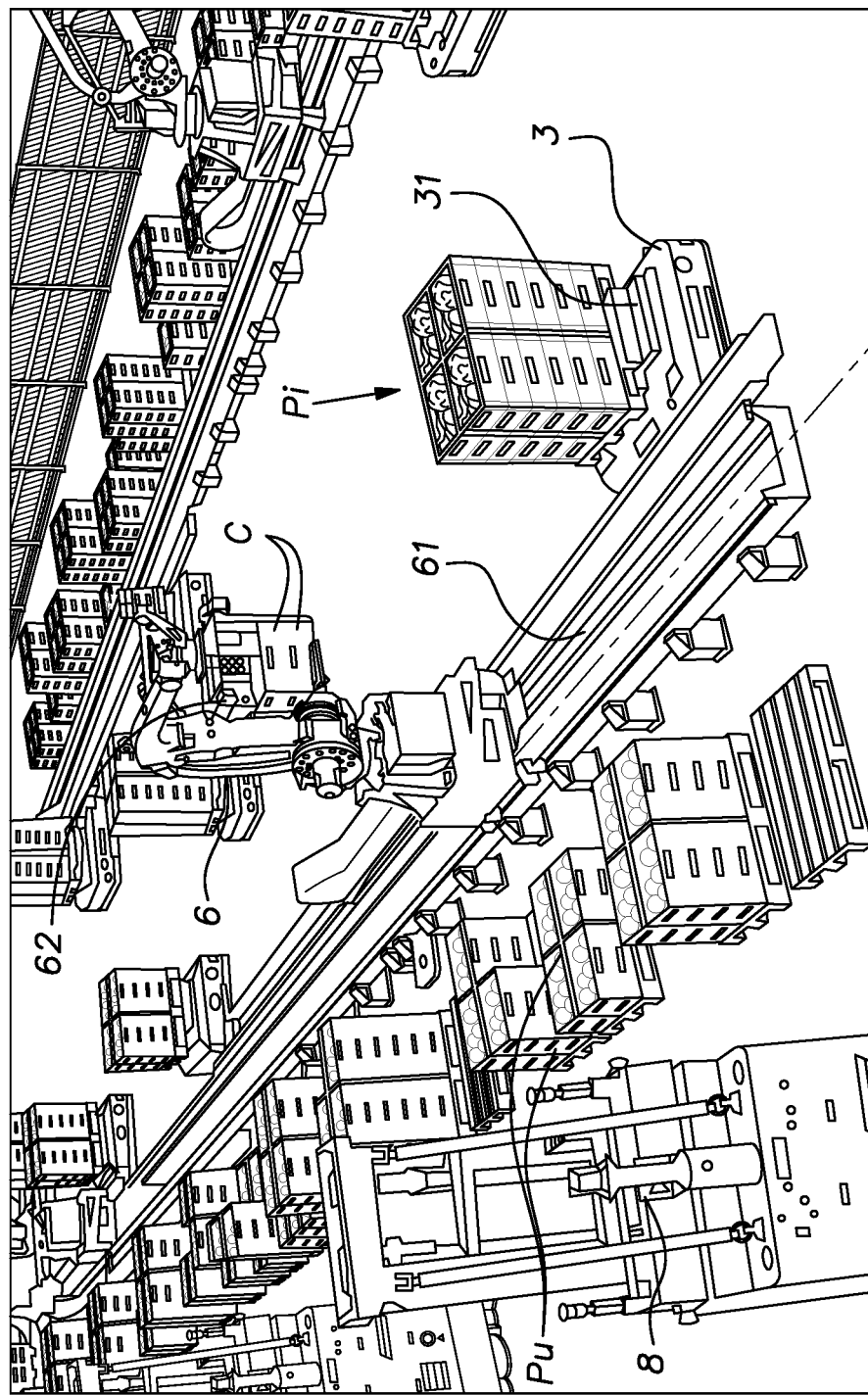
Figure 6:
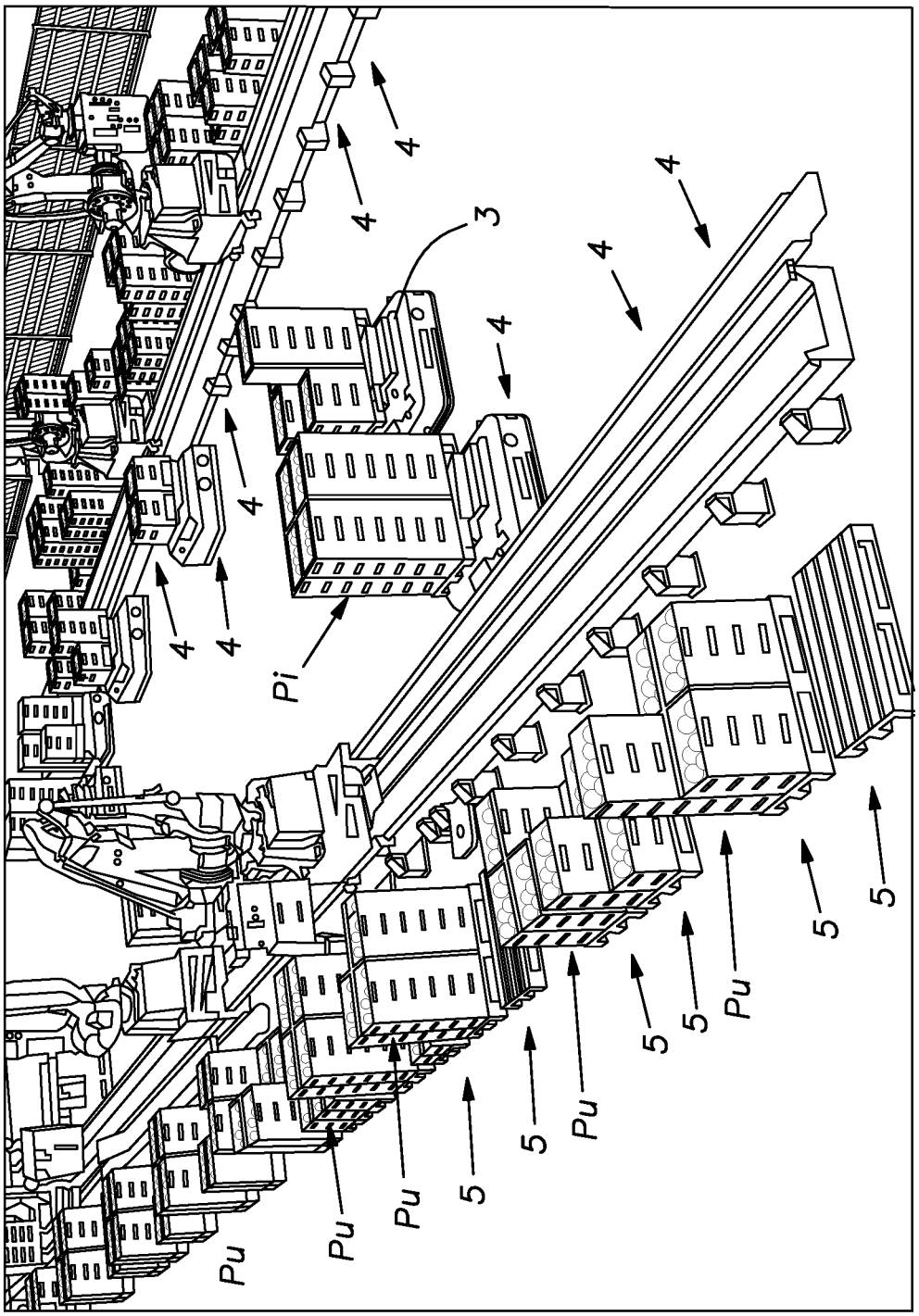
Figure 7:
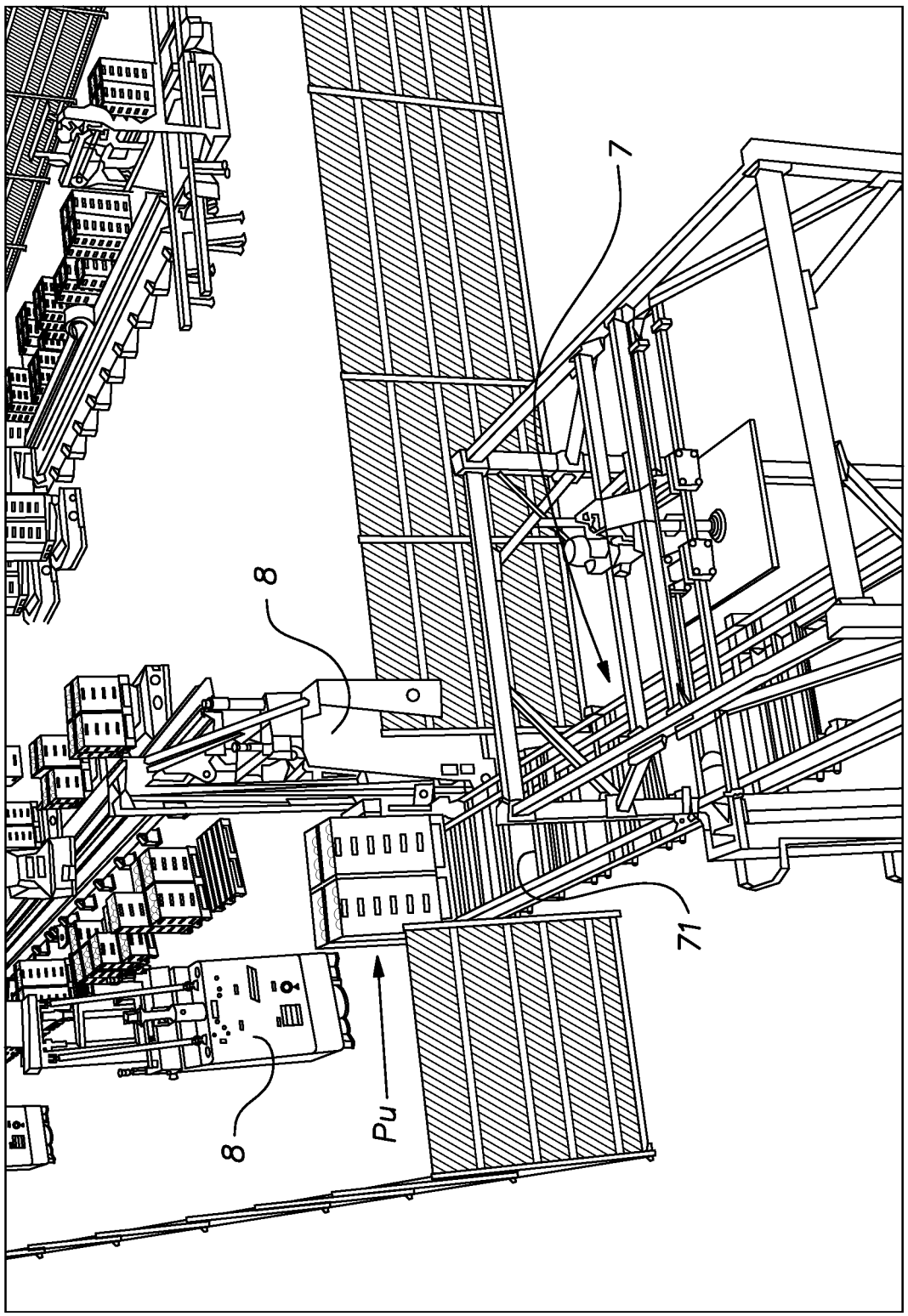

Additional features and advantages of the present invention will become more apparent from the following detailed description of an embodiment of the invention, illustrated by way of non-limiting example in the appended figures in which:

FIGS. 1 to 7 show various perspective views of the plant according to the present invention, in different operating conditions.

In the following description, the term pallet will refer to an assembly formed by a support base, well known in the logistics sector also in standardized formats, and by a stack of objects or packages (C), which may comprise boxes or crates stacked together on the support base.

The name "entry pallet" indicates a pallet which is led to the plant, and which contains objects or packages (C) intended to be sorted and transferred to other pallets inside the plant.

The name "exit pallet" indicates a pallet which is intended to be composed or has been composed with a plurality of objects or packages (C), also different from each other, which have reached the plant on different entry pallets.

The plant for forming pallets according to the present invention comprises an entry station (2), arranged to make an entry pallet (Pi) containing a plurality of packages (C) accessible inside the plant. In the preferred but not exclusive embodiment shown, the entry station (2) comprises a motorized plane (21), movable along an advancement direction between a deposit portion, at which the entry pallets (Pi) can be fed to the entry station (2) in various manners, and a withdrawal portion (22), at which the entry pallets (Pi) are accessible inside the plant. Preferably, at least the withdrawal portion is structured so as to make the entry pallets (Pi) accessible to one or more autonomous entry vehicles or AGVs (3), known in the art, which are provided with a pallet loading platform. To this end, in the embodiment shown, the withdrawal portion (22) is raised from the ground, so as to be at a slightly higher height than the loading platform of the entry AGVs (3).

The plant comprises one or more autonomous entry vehicles or AGVs (3), each of which is arranged to withdraw at least one entry pallet (Pi) from the entry station (2) and to lead the withdrawn pallet (Pi) to a given picking area (4). As already mentioned, each entry AGV (3) comprises a loading platform (31), which, preferably, is movable along a vertical direction between a raised position and a lowered position. In the raised position, the loading platform (31) is capable of raising and taking charge of an entry pallet (Pi) from the withdrawal station (2). In particular, with the loading platform in the lowered position, each entry AGV is capable of positioning itself below the withdrawal portion (22) of the movable plane (21). From this position, by lifting the loading platform (31), the AGV lifts the pallet from the movable plane (21), and can move it away from the latter. To facilitate the action of the loading platform (31), the movable plane (21), or at least the withdrawal portion (22), is substantially defined by a pair of motorized belts, located at a sufficient distance to allow the passage of the loading platform (31). In a possible embodiment, the loading platform (31) comprises a lifting fork, structured to fit beneath a pallet even when the latter is laid on the ground, in a manner known in the art.

The plant comprises a plurality of picking areas (4), each of which is configured to receive at least one entry pallet (Pi).

Each of such picking areas (4) is substantially a defined space, within which an entry AGV (3) can deposit an entry pallet (Pi), by means of unloading means of a known type, or can simply stay for a given time. The picking areas (4) can be defined statically, i.e., they can be fixed and invariably established at least for a certain period of time, or they can be defined dynamically, in relation to a specific cycle of operations included in a given time interval. The management of the picking areas (4), as well as the guiding of the AGVs and the control over the entry station, are governed by a general control module, which will be better described below.

The plant according to the present invention comprises a plurality of release areas (5), each of which is configured to receive at least one exit pallet (Pu). Each of such release areas (5) is substantially a defined space, within which an exit pallet (Pu) can be positioned. The exit pallets (Pu) are led to the release areas (5), and are withdrawn therefrom, by means of one or more autonomous exit vehicles or AGVs (8). Each exit AGV (8) is arranged to transport an exit pallet (Pu), and in particular to withdraw at least one exit pallet (Pu) from one of the release areas (5) and to lead the withdrawn pallet (Pu) to a subsequent release area (5) or an exit station (7). In the embodiment depicted, the exit AGVs (8) comprise a loading fork, known in the art, which is configured to be able to fit beneath a pallet and lift the pallet from the ground, for transport. In a possible alternative embodiment, not illustrated, the exit AGVs (8) can be provided with a loading platform, movable along a vertical direction between a raised position and a lowered position. Similar to the entry AGVs, also in the exit AGVs (8), the loading platform is capable of lifting and taking charge of an entry pallet (Pu) from an automatic warehouse (9), which will be better described below. In particular, with the loading platform in the lowered position, each exit (AGV) (8) is capable of positioning itself below the movable plane (91) of the automatic warehouse (9). From this position, by lifting the loading platform, the AGV lifts the pallet from the movable plane (91), and can move it away from the latter. To facilitate the action of the loading platform, the movable plane (91), or at least a portion of the latter, is substantially defined by a pair of motorized belts.

The exit station (7) is arranged to make an exit pallet (Pu) containing a plurality of packages (C) accessible outside the plant. In the preferred but not exclusive embodiment shown, the exit station (7) comprises a motorized plane (71), movable along an advancement direction between a deposit portion, at which the exit pallets (Pu) can be deposited by the exit AGVs (8), and a withdrawal portion, at which the exit pallets (Pu) are accessible outside the plant, to be withdrawn in various manners.

The exit station (7) and the exit AGVs (8) are also controlled by the aforementioned general control module of the plant.

The plant comprises at least one manipulator (6), structured to withdraw a package (C) from an entry pallet (Pi) and to position the package (C) on an exit pallet (Pu). In particular, the manipulator (6) is arranged to access one or more entry pallets (Pi), to withdraw one or more given packages (C) therefrom, and to deposit the withdrawn packages (C) on one or more exit pallets (Pu). The different exit pallets (Pu) are composed of packages (C) coming from various entry pallets (Pi), in relation to given combinations of packages (C) which must be deposited on each exit pallet (Pu).

Advantageously, and unlike the currently available plants, the manipulator (6) is movable along a path (61) parallel to a main direction (X) between at least two extreme positions. The picking areas (4) are distributed on a withdrawal side of the path (61), in a position reachable by the manipulator (6). The release areas are distributed on a release side, opposite the withdrawal side with respect to the path (61), in a position reachable by the manipulator (6).

By virtue of the possibility of moving along the path (61), the manipulator (6) is able to reach a high number of picking areas (4) and release areas (5), i.e., a potentially indefinite number of areas (4,5), in relation to the length of the path (61). The picking areas (4) are distributed along the withdrawal side of the path (61), preferably aligned along the main direction (X). Similarly, the release areas (5) are distributed along the release side, preferably aligned along the main direction (X). The manipulator (6) is capable of reaching all the picking areas (4), and therefore is capable of accessing all the entry pallets (Pi) positioned at the areas (4) themselves, withdrawing the envisaged packages (C) from each entry pallet (Pi), placing the packages (C) at the previously selected release areas (5), and depositing the packages (C) on the corresponding exit pallets (Pu). The composition of each exit pallet (Pu) is governed by the control module, based on a control algorithm, programmable according to specific requests for the composition of each pallet. In particular, the control module knows the composition of each entry pallet (Pi) and the relative picking area (4), as well as the composition required for each exit pallet (Pu) and the relative release area (5).

The solution in accordance with the present invention, by virtue of the possibility of movement of the manipulator (6) along the path (61), therefore allows to significantly increase the flexibility and production capacity of the plant.

Of course, the plant can be provided with further manipulators (6), each movable along its own path (61) which can be placed inside the plant according to need. In the embodiment depicted, for example, two manipulators (6) are located along the same path (61). Each manipulator (6) therefore covers a section of the path (61). It is further possible to arrange two paths (61), each covered by two manipulators (6).

In the preferred but not exclusive embodiment depicted, the manipulator (6) comprises a robotic arm (62) provided with a gripping member (63), structured to be able to grasp one or more packages (C). The robotic arm (62) is structured to move the gripping member (62) in space along three perpendicular directions.

The robotic arm (62) is movable along the path (61). To this end, the robotic arm (62) is associated with a cart (63) which is movable along the path (61) by motor means, known in the art.

Furthermore, the gripping member (63) is preferably rotatable about a vertical axis with respect to the robotic arm (62). Overall, the robotic arm (62) is known in the field and will therefore not be described in further detail. Various embodiments are indeed known to the person skilled in the art.

The plant according to the present invention can be provided with an automatic warehouse (9) for empty pallets (P), configured to accommodate a plurality of empty pallets (P) and to make the empty pallets (P) available to the autonomous exit vehicles (8). In the embodiment depicted, the automatic warehouse (9) comprises an accumulation area of the pallets (P), stacked one on top of the other. A movable plane (91) is arranged to transport the pallets (P) along a horizontal direction, passing through the accumulation area. In particular, the accumulation area is positioned in an intermediate section of the movable plane (91). A lifter (92) is arranged to lift and lower the stack of pallets (P), leaving the lower pallet (P) of the stack free, which can be freely transported from the movable plane (91). In particular, if the withdrawal of a pallet (P) is required, the lifter (92) lifts the stack, leaving the lower pallet free. The movable plane (91) activates and leads the pallet to an end area thereof, at which the pallet is available for withdrawal by an exit AGV (8). If instead the deposit of a pallet (P) is required, the latter is deposited on the movable plane (91) by an exit AGV (8). The lifter (92) lifts the pallet stack, freeing the lower position. The movable plane (91) then leads the pallet (P) to the lower position of the stack.

Preferably, the movement of the empty pallets (P) is carried out by the exit AGVs (8), provided with a loading fork. The exit AGVs (8) are guided by the control module to withdraw the entry pallets (Pi) from the picking areas (4), after they have been emptied by the manipulator (6), and to lead them to the automatic warehouse or directly to a release area (5). Furthermore, the exit AGVs (8) are arranged, under the control of the control module, to withdraw the empty pallets (P) from the automatic warehouse (9) and lead them to the release areas (5).

As already mentioned, the plant according to the present invention comprises a control module, arranged to control the autonomous entry vehicles (3), the autonomous exit vehicles (8) and the manipulator (6) according to a predetermined control algorithm.

In a manner known in the art, the control algorithm operates on the basis of at least the following data:

composition of the entry pallets (Pi), comprising the number and type of packages (C);

position of the picking areas (4) and the release areas (5), comprising the presence or absence of a pallet;

position of the entry AGVs (3) and exit AGVs (8), comprising the presence or absence of a pallet on board;

position of the manipulator (6);

desired composition of each exit pallet (Pu).

In particular, the composition of each entry pallet (Pi) is well known in the field, at the entrance to the plant, in terms of number and type of packages (C), or in terms of the content of each package (C). The control module acquires the data related to the composition of each entry pallet (Pi).

The control module also knows the position of the release areas (5), at which the formation of the exit pallets (Pu) is envisaged. Based on the composition data of each entry pallet (Pi) and each exit pallet (Pu), the control module guides each entry AGV (3) to place each entry pallet (Pi) in a given picking area (4), so as to optimize the subsequent movements of the manipulator (6) or each manipulator (6), if more than one is present. In other words, the control module places each entry pallet (4) in the picking area (4) which, in the subsequent steps, allows to minimize the movements of each manipulator (6), which must withdraw the packages (C) from the entry pallet (Pi) and transfer them to an exit pallet (Pu).

Knowing the contents of each package (C) and tracing the movements and the withdrawal and release operations of the manipulator (6), the control module acquires the progressive emptying of the entry pallets (Pi) and the progressive composition of the exit pallets (Pu) in real time.

Each exit pallet (Pu) can be composed while remaining stationary in a given release area (5), or can be led by an exit AGV (8) in one or more subsequent release areas (5), depending on the position of the packages (C) which it is intended to receive and depending on the minimization of the movements necessary for the manipulators (6) used, in any number, and the AGVs themselves.

When the composition of an exit pallet (Pu) is completed, the control module activates an exit AGV (8) so that the latter reaches the release area (5) where the complete pallet (Pu) is located, withdraws the complete pallet and leads it to the exit station (7), or to another area of the plant.

As already indicated, the empty entry pallets (Pi) are instead led to the automatic warehouse (9), or to a release area (5), by an exit AGV (8).

The overall operation of the plant can therefore be managed completely automatically, offering great flexibility in terms of composition of the exit pallets (Pu).

The invention claimed is:

1. A plant for forming pallets, comprising:
an entry station (2), arranged to make an entry pallet (Pi) containing a plurality of packages (C) accessible inside the plant;
a plurality of picking areas (4), each of which is configured to receive at least one entry pallet (Pi);
one or more autonomous entry vehicles (3), each of which is arranged to withdraw at least one entry pallet (Pi) from the entry station (2) and to lead the withdrawn pallet (Pi) to a given picking area (4);
a plurality of release areas (5), each of which is configured to receive at least one exit pallet (Pu);
at least one manipulator (6), structured to withdraw a package (C) from an entry pallet (Pi) and to position the package (C) on an exit pallet (Pu);
an exit station (7), arranged to make an exit pallet (Pu) containing a plurality of packages (C) accessible outside the plant;
one or more autonomous exit vehicles (8), each of which is arranged to withdraw at least one exit pallet (Pu) from the release area (5) and to lead the withdrawn pallet (Pu) to a subsequent release area (5) or to the exit station (7);
characterized in that: the manipulator (6) is movable along a path (61) parallel to a main direction (X) between at least two extreme positions; the picking areas (4) are distributed on one side of the path (61), in a position reachable by the manipulator (6); the release areas are distributed on the opposite side of the path (61) with respect to the picking areas (4), in a position reachable by the manipulator (6),
a control module, arranged to control the autonomous entry vehicles (3), the autonomous exit vehicles (8) and the manipulator (6) according to a predetermined control algorithm,
wherein the control module operates on the basis of at least the following data:
composition of the entry pallets (Pi), comprising the number and type of packages (C);
position of the picking areas (4) and the release areas (5), comprising the presence or absence of a pallet;
position of the entry AGVs (3) and exit AGVs (8), comprising the presence or absence of a pallet on board;
position of the manipulator (6);
desired composition of each exit pallet (Pu), and
based on the composition of each entry pallet (Pi) and each exit pallet (Pu), the control module guides each entry AGV (3) to place each entry pallet (Pi) in a given picking area (4), so as to optimize the subsequent movements of the manipulator (6) when withdrawing the packages (C) from the entry pallet (Pi) and transferring them to the exit pallet (Pu).

2. The plant according to claim 1, wherein the manipulator (6) comprises a robotic arm (62) provided with a gripping member (63), structured to be able to grasp one or more packages (C).

3. The plant according to claim 2, wherein the robotic arm (62) is structured to move the gripping member (62) in space along three perpendicular directions.

4. The plant according to claim 2, wherein the robotic arm (62) is movable along the path (61).

5. The plant according to claim 2, wherein the gripping member (63) is rotatable about a vertical axis with respect to the robotic arm (62).

6. The plant according to claim 1, comprising an automatic warehouse (9) for empty pallets (P), configured to accommodate a plurality of empty pallets (P) and to make the empty pallets (P) available to the autonomous exit vehicles (8) and/or to the autonomous entry vehicles (3).

7. The plant according to claim 1, wherein the control module further traces movements of the manipulator to acquire information about the progressive emptying of the entry pallet (Pi) containing the plurality of packages (C) and the progressive composition of the exit pallet (Pu).

8. The plant according to claim 1, wherein once the entry pallet (Pi) is empty by the manipulator (6) transferring the packages (C), the empty entry pallet (Pi) is led to the release area (5) by the exit AGV (8).

9. The plant according to claim 1, wherein the manipulator (6) withdraws the packages (C) from each entry pallet (Pi) placed in the picking area to empty the entry pallet (Pi).

* * * * *